United States Patent

[11] 3,563,304

| | | |
|---|---|---|
| [72] | Inventor | William L. McGrath<br>Syracuse, N.Y. |
| [21] | Appl. No. | 794,634 |
| [22] | Filed | Jan. 28, 1969 |
| [45] | Patented | Feb. 16, 1971 |
| [73] | Assignee | Carrier Corporation<br>Syracuse, N.Y.<br>a corporation of Delaware |

[54] REVERSE CYCLE REFRIGERATION SYSTEM UTILIZING LATENT HEAT STORAGE
5 Claims, 1 Drawing Fig.

[52] U.S. Cl. .................................................. 165/2, 165/29
[51] Int. Cl. .................................................. F25b 29/00
[50] Field of Search .................................. 165/17, 29, 2, 62

[56] References Cited
UNITED STATES PATENTS
1,969,187  8/1934  Schutt ........................ 165/29
3,186,477  1/1965  Bell Jr. ........................ 165/29
3,366,166  1/1968  Gerteis ........................ 165/29

*Primary Examiner*—Charles Sukalo
*Attorneys*—Harry G. Martin, Jr. and J. Raymond Curtin ABSTRACT: A reverse cycle refrigeration system having an indoor heat exchanger, an outdoor heat exchanger, a refrigerant compressor, and reversing valve means for selectively operating the system to provide heating or cooling from the indoor heat exchanger. The outdoor heat exchanger includes a portion disposed in heat exchange relation with a pool of water and another portion disposed in heat exchange relation with ambient air during heating mode operation. The latent heat of fusion of the water is extracted to provide indoor heating while freezing the water in the system. An electrical resistance heater is provided so that the ice formed in the water may be melted during periods of time when electric rates are low.

PATENTED FEB 16 1971
3,563,304
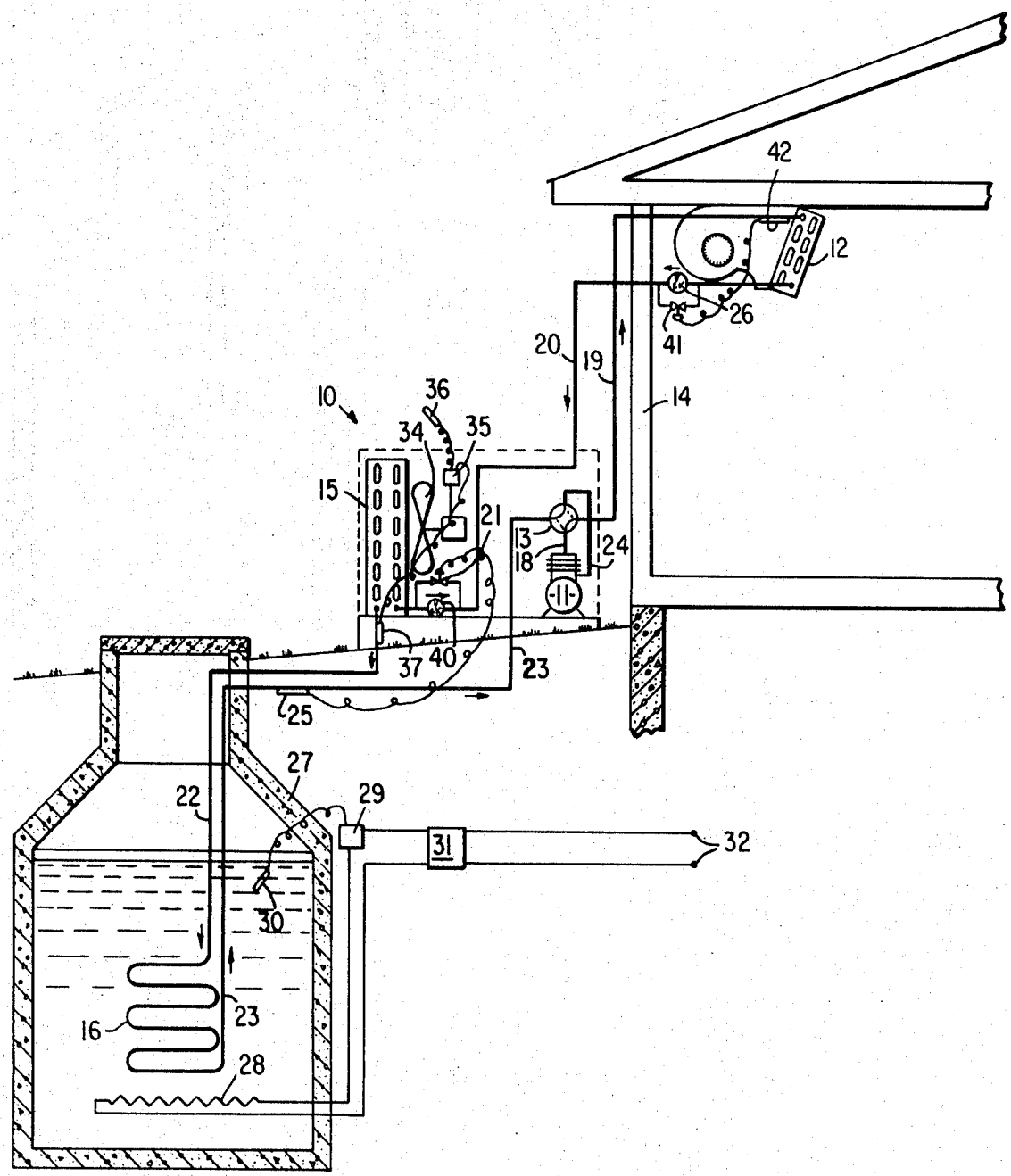
INVENTOR.
WILLIAM L. MC GRATH.
BY
Frank N. Decker Jr.
ATTORNEY.

REVERSE CYCLE REFRIGERATION SYSTEM UTILIZING LATENT HEAT STORAGE

BACKGROUND OF THE INVENTION

Reverse cycle refrigeration systems which may be operated to provide either heating or cooling at a desired location are well known. Prior systems have generally employed an outdoor heat exchanger in heat exchange relation with ambient air so that heat is absorbed from the air and pumped to air indoor heat exchanger when indoor heating is desired. While such systems are practical at moderately low ambient temperatures, the systems are not entirely satisfactory at very low ambient temperatures. During severe winter conditions, prior reverse cycle systems may be unable to provide satisfactory heating. The amount of heating which the system can provide is reduced at very low ambient temperatures, because the capability and efficiency of the system decreases as the temperature lift between the indoor and outdoor heat exchangers increases. The volumetric efficiency of the compressor becomes less as the outdoor temperature drops, thereby reducing the amount of heat transferred between the heat exchangers. In addition, the density of the suction gas is less at low outdoor temperatures which results in a lower volume of refrigerant being pumped and consequently a lower quantity of heat being transferred. It would be possible to store heat by heating water which is in heat exchange relation with the "outdoor heat exchanger" in order to maintain the heat source temperature at a high level to overcome the foregoing problems. This arrangement however suffers the disadvantage of requiring a large liquid heat storage volume in order to provide heating for an extended period of time because of the limited thermal capacity of the water.

SUMMARY OF THE INVENTION

In accordance with this invention, there is provided a reverse cycle refrigeration system having an indoor heat exchanger, an outdoor heat exchanger, a compressor, and a suitable reversing valve. The outdoor heat exchanger comprises a portion which is in heat exchange relation with a water-filled cistern or tank and may include another portion which is in heat exchange relation with ambient air. A heating means is disposed in heat exchange relation with the water-filled tank and is preferably of an electrical resistance type which is connected through a time clock and a thermostat to a source of electrical power. When it is desired to provide heating to the indoor coil, at relatively high ambient outdoor air temperatures, the system may be operated in a normal heating mode in which heat is chiefly absorbed by the outdoor heat exchanger from the ambient air to evaporate refrigerant. The refrigerant then passes through the portion of the heat exchanger in the water-filled tank, is compressed by the compressor, and is condensed in the indoor heat exchanger to provide heating. As the outdoor temperature drops below the freezing point of the water, or some other level, less refrigerant is evaporated in the portion of the outdoor heat exchanger which is in heat exchange relation with the ambient air and a greater portion of refrigerant is evaporated in the portion of the heat exchanger disposed in the water-filled tank. After a period of time, ice is formed in the tank as the latent heat of fusion of the water is withdrawn to provide heating to the desired location.

The electric resistance heater is energized during periods of time when the electric power rate or demand is low in order to melt ice in the tank. Thus the heat pump system may utilize low cost power to restore the heat of fusion to the ice. The volume of the tank need not be as large as prior heat storage systems because of the relatively high latent heat of fusion available for heating. Furthermore, the heat-cool ratio of the system is greatly improved by maintaining a minimum outdoor heat exchanger evaporation temperature equal to that of the freezing point of ice, which results in a relatively higher coefficient of performance in the heating mode than prior systems.

BRIEF DESCRIPTION OF THE DRAWING

The drawing is a schematic illustration of a reverse cycle refrigeration system partly in cross section utilizing a water-filled tank in accordance with this invention.

DESCRIPTION OF THE PREFERRED EMBODIMENT

Referring to the drawing, there is illustrated a reverse cycle refrigeration system 10 principally comprising a compressor 11, a four-way reversing valve 13, an indoor heat exchanger 12, and an outdoor heat exchanger comprising a first portion 15 and a second portion 16. The system is connected to selectively provide heating or cooling from indoor heat exchanger 12 depending on the position of reversing valve 13.

As shown in the drawing, reversing valve 13 is in a position to provide heating from the indoor heat exchanger 12. In this position, hot gas from compressor 11 passes through hot gas passage 18, reversing valve 13 and passage 19 to indoor heat exchanger 12. The hot gas is condensed in heat exchanger 12, thereby giving up heat to a desired location in building 14.

The condensed refrigerant from indoor heat exchanger 12 passes through check valve 26 and refrigerant passage 20, through thermal expansion valve 21, to first portion 15 of the outdoor heat exchanger. The refrigerant then passes from first portion 15 through refrigerant passage 22 to second portion 16 of the outdoor heat exchanger where any remaining refrigerant is evaporated. The refrigerant vapor passes through refrigerant passage 23, reversing valve 13 and refrigerant passage 24 back to compressor 11. A refrigerant bulb 25 is suitably disposed in heat exchange relation with refrigerant passage 23 to control refrigerant passage through the outdoor heat exchanger when the system is operating in the heating mode.

Second portion 16 of the outdoor heat exchanger is disposed in heat exchange relation with a water-filled tank 27 which may be buried in the ground or otherwise located as desired. Tank 27 is provided with an electric resistance heater 28 which is connected, through a thermostat 29 and a time clock 31, to a source of electric power 32. Thermostat 29 is provided with a temperature sensing bulb 30 located to sense the temperature of water or ice in tank 27.

Heat exchanger 15 is in heat exchange relation with the ambient air outside of the building 14. A fan 34 passes air through heat exchanger 15. Fan 34 preferably includes an electric motor, which is energized by the closing of a differential thermostat 35. Differential thermostat 35 may have a pair of temperature sensing bulbs including bulb 36 which is responsive to ambient air temperature and bulb 37 which is responsive to temperature of refrigerant leaving heat exchanger 15. When the difference between the temperatures sensed by the two temperature-sensing bulbs drops below some predetermined value indicative of a low ambient temperature, the fan is deenergized. Alternatively, thermostat 55 may deenergize fan 35 at a fixed ambient air or refrigerant temperature such as 32° F.

In the cooling mode of operation, reversing valve 13 is rotated to a position (not shown) such that hot gas from passage 18 is directed through passage 23 to outdoor heat exchangers 16 and 15 respectively. Condensed refrigerant from heat exchanger 15 passes through check valve 40 and thermal expansion valve 41 to indoor heat exchanger 12 where it absorbs heat to provide cooling to building 14. The evaporated refrigerant passes through refrigerant passage 19, valve 13 and passage 24 back to the compressor. A temperature sensing bulb 42 on passage 19 governs passage of refrigerant through thermal expansion valve 31 in the cooling mode.

In accordance with this invention, when heating is desired in building 14 and the outdoor air temperature surrounding heat exchanger 15 is above the freezing point of water, fan 34 is energized to pass air over the heat exchanger. The resulting heat exchange with ambient air absorbs heat therefrom and evaporates the liquid refrigerant in heat exchanger 15. Any remaining unevaporated refrigerant passes along with the refrigerant vapor through heat exchanger 16 in tank 27 where the unevaporated remainder is vaporized by absorption of heat from the water in the tank. The refrigerant vapor is then compressed by compressor 11 and condensed in condenser 12 to provide heating in the usual manner.

In the event the ambient air temperature surrounding heat exchanger 15 drops so that an insubstantial portion of refrigerant is evaporated in heat exchanger 15, the temperature difference between bulbs 36 and 37 will decrease and fan 34 will be deenergized. In this event, most of the refrigerant will leave heat exchanger 15 in a liquid state and pass through passage 22 to heat exchanger 16 in the tank. The liquid refrigerant will then absorb the heat from the water in the tank 27 and be evaporated in heat exchanger 16. Since heat is being absorbed from the water in the tank, the water will eventually freeze forming ice as it gives up its latent heat of fusion. In effect, when the ambient temperature decreases below the freezing point of water, the latent heat of fusion of the water will be utilized as the heat source to provide heating to building 14.

The time clock 31 controlling electric resistance heater 28 is arranged so that power may be supplied to the heater during periods of time when electric power rates or demand are at a minimum. This is advantageous in many locations where electric utilities offer lower power rates during periods of time when electric power consumption is at a minimum, or exact a charge based on the maximum power demand required.

When bulb 30 of thermostat 29 senses a temperature in tank 27 at or below the freezing point of water, the thermostat closes to energize electric heater 28 and time clock 31 completes the circuit providing preferential power rates are in effect. While the time clock has been shown for purposes of illustration, it will be apparent that other current switching devices, such as a carrier current operated relay may be utilized in response to an appropriate signal indicating that preferential power rates are in effect either due to reduced utility rates or low additional power demand by the user.

Operation of electric heater 28 will melt any ice in tank 27 and raise the temperature of the water therein to any desired value. It is not desirable, however, to raise the temperature of water in tank 27 appreciably above the freezing point because heat loss from the tank would be excessive in comparison to the amount of heat which could be withdrawn by sensible cooling of water during heating mode operation. For example, the available latent heat of fusion of the ice is about 144 B.t.u. per pound while raising the temperature of the water all the way to the boiling point would only provide about 180 B.t.u. per pound and would result in excessive heat loss from the storage reservoir.

From the foregoing, it will be seen that utilization of latent heat of fusion as a heat source for the heat pump results in a number of substantial advantages over prior systems. For example, the size of tank may be relatively small for a given amount of heat in comparison with a heat storage reservoir which utilizes sensible cooling of water to provide heat. Furthermore, until all of the water in the tank is frozen to solid ice, minimum refrigerant evaporation temperature in the system is maintained at 32° F, thereby preventing excessively high lift across the compressor. This in turn results in a high refrigeration cycle efficiency and provides a high coefficient of performance when operating the system in the heating mode. In addition, a reverse cycle refrigeration system in accordance with this invention provides an improved heating-to-cooling ratio for a given size system which is desirable for providing heating in colder climates. At the same time, it will be appreciated that the utilization of low cost electric power or reduction of demand charges improves the economy of this system.

Various modifications of the invention may be made without departing from the scope thereof. For example, heat exchanger 15 may be utilized as a subcooler during conditions of low ambient operation if desired, by the addition of a suitable thermal expansion valve and a bypass valve between the heat exchanger 15 and heat exchanger 16. Likewise, a cascade arrangement of heat pumps may be utilized with tank 27 being either the heat source of the heat sink for a low pressure heat pump stage depending on the desired conditions of operation of the system.

Accordingly, the invention may otherwise be embodied within the scope of the following claims.

I claim:

1. A reverse cycle refrigeration system comprising a compressor, an indoor heat exchanger, a first outdoor heat exchanger, a second outdoor heat exchanger, refrigerant expansion means and reversing means connected in a refrigeration circuit for selectively providing heating by condensing refrigerant in the indoor heat exchanger and evaporating refrigerant in the outdoor heat exchangers; a tank containing a freezable liquid; said first outdoor heat exchanger being disposed in heat exchange relation with the freezable liquid in said tank; said second outdoor heat exchanger being disposed in heat exchange relation with ambient air; passage means disposed to pass condensed refrigerant from the indoor heat exchanger serially through said second outdoor heat exchanger and then through said first outdoor heat exchanger for absorption of heat first from the ambient outdoor air and thereafter from the freezable liquid in said tank when said system is arranged for providing heating from said indoor heat exchanger; fan means for passing ambient air over said second outdoor heat exchanger in heat exchange relation with refrigerant therein for evaporating said refrigerant when the system is providing heating from the indoor heat exchanger; wherein the improvement comprises control means for controlling the operation of said fan, said control means having a first temperature sensor disposed for sensing a first temperature comprising the temperature of refrigerant leaving the second heat exchanger and passing to the first heat exchanger, said control means being arranged to energize said fan when the temperature sensed by said first temperature sensor exceeds a second temperature so that the refrigerant is evaporated in the second outdoor heat exchanger to absorb substantial heat from the ambient air, said control further being arranged to deenergize said fan when the temperature sensed by said first temperature sensor drops below said second temperature so that the refrigerant is evaporated in the first outdoor heat exchanger to remove substantial latent heat of fusion from and freeze the liquid in said tank, and heating means for raising the temperature of liquid in said tank slightly above the freezing temperature of the liquid therein at desired periods of time.

2. A reverse cycle refrigeration system as defined in claim 1 wherein said system includes a second temperature sensor for sensing said second temperature, said second temperature sensor being disposed to sense the temperature of ambient air; said control means including a differential thermostat responsive to the difference between said first and second temperatures for energizing said fan when said differences in temperatures is relatively large and for deenergizing said fan when said difference in temperatures is relatively small to thereby selectively absorb heat from either ambient air or liquid in said tank depending on said difference in temperatures.

3. A method of operating a reverse cycle refrigeration system having a compressor, an indoor heat exchanger, a liquid-filled tank, heating means disposed in heat exchange relation with the liquid in the tank, a first outdoor heat exchanger disposed in heat exchange relation with the liquid in the tank, a second outdoor heat exchanger disposed in heat exchange relation with ambient air and refrigerant expansion means; said method comprising:

a. passing refrigerant vapor to the compressor and compressing the vapor therein;

b. passing compressed vapor from the compressor to the indoor heat exchanger and condensing the compressed refrigerant in the indoor heat exchanger to provide heating to a desired location;

c. freezing liquid in the tank and absorbing substantial latent of fusion of the liquid therefrom by evaporating a substantial portion of the condensed refrigerant in said first outdoor heat exchanger when the ambient air temperature is relatively low, and absorbing substantial heat from the ambient air by evaporating a substantial portion of the condensed refrigerant in said second outdoor heat exchanger when the ambient temperature is relatively high; and d. melting frozen liquid in the tank by heating the frozen liquid to restore the latent heat of fusion to the liquid in the tank when desired.

4. A method of operating a reverse cycle refrigeration system as defined in claim 3 including the step of varying the proportion of condensed refrigerant passed to said first heat exchanger by controlling passage of ambient air over said second heat exchanger in response to the temperature of refrigerant passing from said first outdoor heat exchanger to said second outdoor heat exchanger.

5. A method of operating a reverse cycle refrigeration system as defined in claim 4 including a step of controlling the passage of ambient air over said second heat exchanger in response to the difference in temperature between said ambient air temperature and the temperature of refrigerant passing from said first outdoor heat exchanger to said second outdoor heat exchanger.